W. FRICKER.
MACHINE FOR MAKING PAPER BAGS.
APPLICATION FILED DEC. 28, 1906.

944,851.

Patented Dec. 28, 1909.
9 SHEETS—SHEET 1.

Fig. 1.

W. FRICKER.
MACHINE FOR MAKING PAPER BAGS.
APPLICATION FILED DEC. 28, 1906.

944,851.

Patented Dec. 28, 1909.
9 SHEETS—SHEET 2.

Witnesses:

Inventor
Walter Fricker
By
James L. Norris
Atty.

W. FRICKER.
MACHINE FOR MAKING PAPER BAGS.
APPLICATION FILED DEC. 28, 1906.

944,851.

Patented Dec. 28, 1909.
9 SHEETS—SHEET 3.

Witnesses:

Inventor
Walter Fricker
By
James L. Norris,
Atty.

W. FRICKER.
MACHINE FOR MAKING PAPER BAGS.
APPLICATION FILED DEC. 28, 1906.

944,851.

Patented Dec. 28, 1909.
9 SHEETS—SHEET 4.

W. FRICKER.
MACHINE FOR MAKING PAPER BAGS.
APPLICATION FILED DEC. 28, 1906.

944,851.

Patented Dec. 28, 1909.
9 SHEETS—SHEET 6.

Witnesses

Inventor
Walter Fricker
By
James L. Norris
Atty

W. FRICKER.
MACHINE FOR MAKING PAPER BAGS.
APPLICATION FILED DEC. 28, 1906.

944,851.

Patented Dec. 28, 1909.
9 SHEETS—SHEET 7.

Witnesses:

Inventor
Walter Fricker
By
James L. Norris.
Atty.

W. FRICKER.
MACHINE FOR MAKING PAPER BAGS.
APPLICATION FILED DEC. 28, 1906.

944,851.

Patented Dec. 28, 1909.
9 SHEETS—SHEET 8.

Witnesses:

Inventor
Walter Fricker
By
James L. Norris.
Atty

W. FRICKER.
MACHINE FOR MAKING PAPER BAGS.
APPLICATION FILED DEC. 28, 1906.

944,851.

Patented Dec. 28, 1909.
9 SHEETS—SHEET 9.

Witnesses:

Inventor
Walter Fricker

UNITED STATES PATENT OFFICE.

WALTER FRICKER, OF SOUTH WOODFORD, ENGLAND.

MACHINE FOR MAKING PAPER BAGS.

944,851. Specification of Letters Patent. Patented Dec. 28, 1909.

Application filed December 28, 1906. Serial No. 349,883.

*To all whom it may concern:*

Be it known that I, WALTER FRICKER, a subject of the King of Great Britain, residing at Kelbrook, Stanley Road, South Woodford, county of Essex, England, have invented certain new and useful Improvements in Machines for Making Paper Bags, of which the following is a specification.

My invention relates to a machine for making paper bags, of either the outward folded block bottom shape, or the inward folded block bottom shape, the change being made with but a slight alteration to the machine.

The bags can be made either lined or unlined from cut sheets of paper or other like material, which are not of necessity cut to exact size, the mechanism allowing of a good variation, without altering the size of bag, thus obviating any waste caused by trimming to uniform size.

My invention will be clearly understood from the following description aided by the accompanying drawings in which:—

The cut sheets 1 are fed by hand or by one or other of the automatic feeding devices known, but preferably by hand, across a recessed rising and registering table 2 with sinking platform 3 controlled by a spring 4 encircling its rod 5, which table 2 folds the paper against the sides of two parallel channel mold bars 6. Fixed to the back of this table 2 is a movable gage 7 adjustable to suit size of paper, and in the center of this gage 7 is a sensitive finger 8 fixed to the bed or frame 9 of the machine, and leaning over so as to nearly touch the paper on the rising table 2. Inserted in this rising table 2 is a loose roller 10 against which the finger 8 touches when rising.

Figures 16, 17, 25:
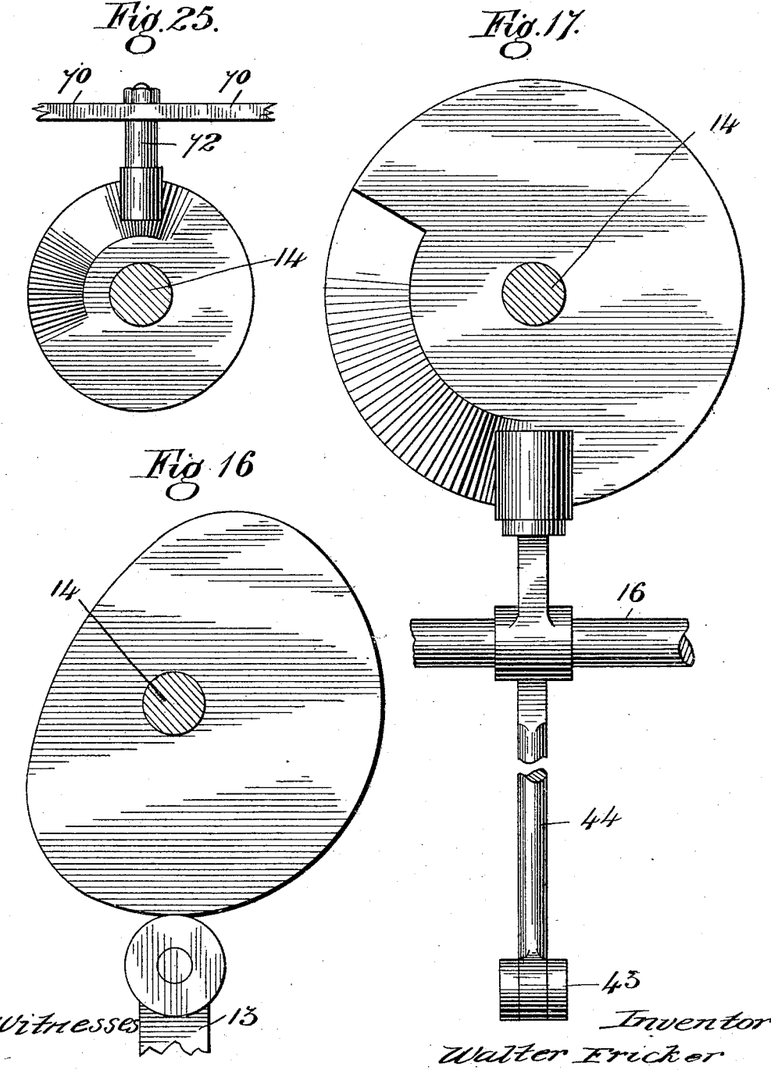
Fig. 16 is an elevation of a cam for operating a lever to move the rising table.
Fig. 17 is an elevation of a cam for operating a shaft to move a lip for folding down one edge of the paper, and at the same time operate a pivoted lever for operating paste boxes.
Fig. 25 is an elevation of a cam for operating a depending arm moving flexible tuck springs for folding in the open end of the bag.

The rising table 2 is supported by a rod 11 situate in bearings of the frame 9, as also is the platform rod 5. The platform is situate within the table, its rod 5 projecting through the bottom thereof, which rod is provided with a collar 12 which finds a bearing against the under side of the bottom of the table 2, and is thus held from projecting above the table itself. The rod 11 is connected to a rocking lever 13, and is operated to move the table 2 and platform 3 by a cam (see Fig. 16) on the shaft 14.

Figure 1:
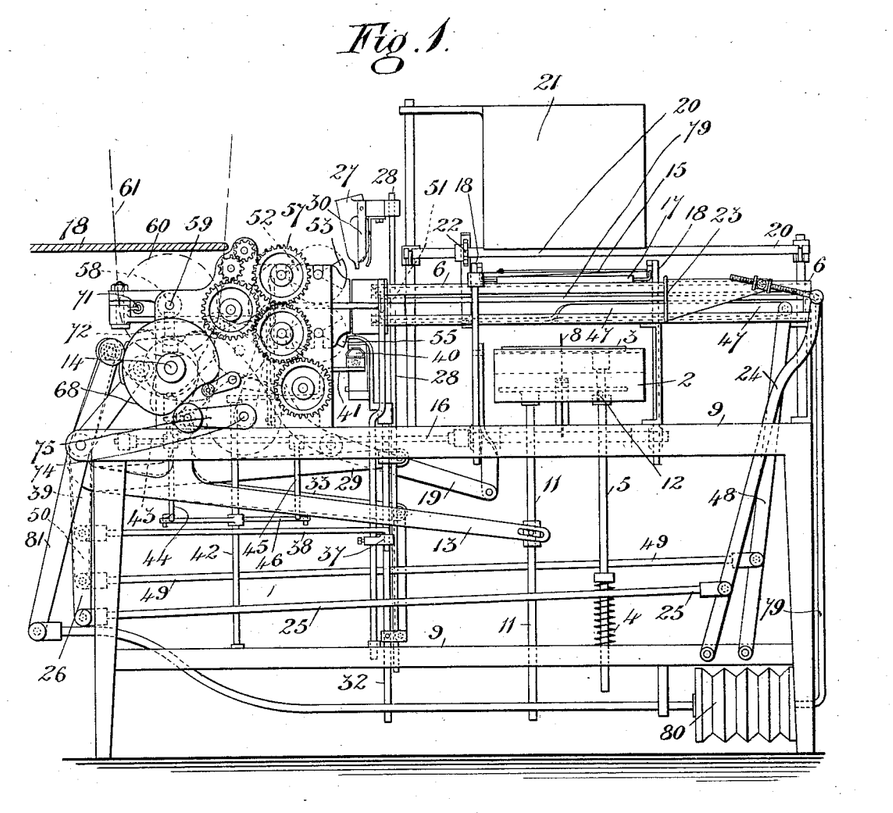
Figure 1. is a side elevation of a machine.
Figures 2, 3, 4, 5, 6, 7, 8:
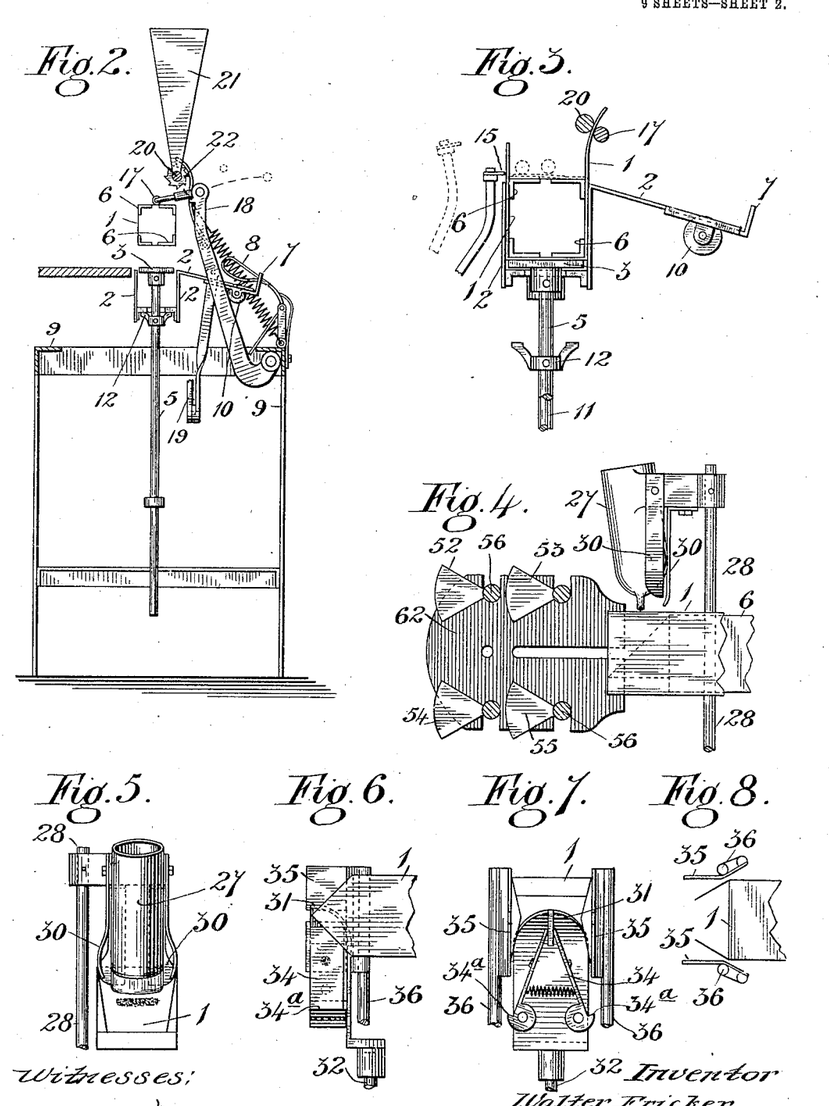
Fig. 2. is a cross section showing the rising and falling table and top pasting mechanism.
Fig. 3. is a detail view of the first folding and top pasting device.
Fig. 4. is a view showing the top end pasting device.
Fig. 5. is a front view of Fig. 4.
Fig. 6. is a side view of the bottom end folders.
Fig. 7. is a front view of same.
Fig. 8. is a plan showing the shutters for closing the flaps.
Figure 9:
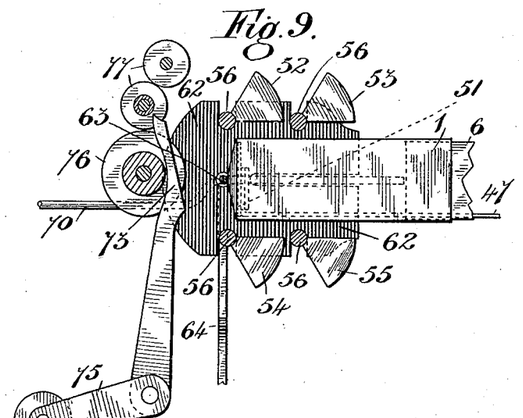
Fig. 9. is a view showing the bag after being folded and just previous to leaving the mold.
Figure 10:
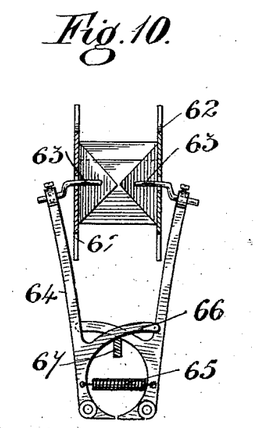
Fig. 10. is an elevation of the bottom of bag with the fingers and tabs in position.
Figure 11:
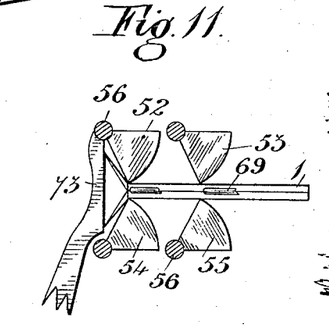
Fig. 11. is a view showing the bag flattening devices.
Figure 12:
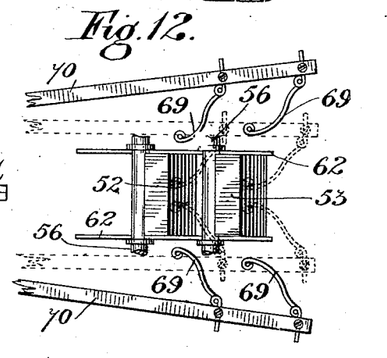
Fig. 12. is a plan showing the flexible tuck springs in position.
Figures 18, 21, 23:
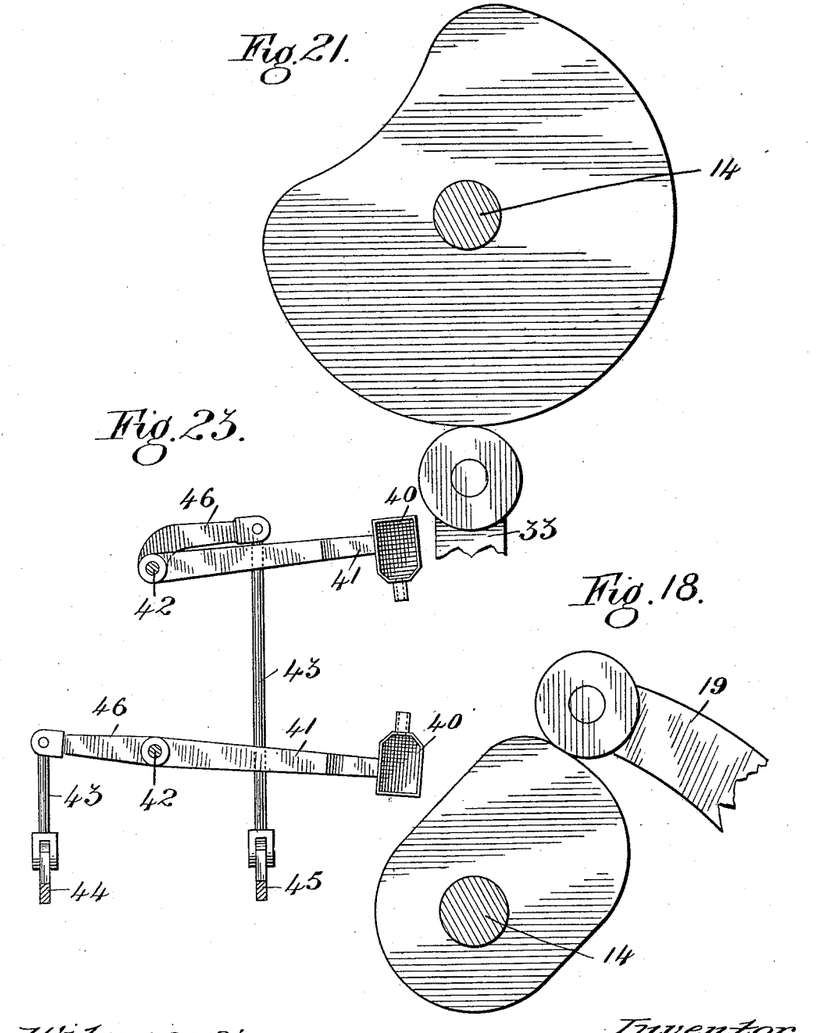
Fig. 18 is an elevation of a cam for operating a lever to fold down the other or pasted edge of the paper.
Fig. 21 is a side elevation of a cam for operating a rod to move appliance for folding the bottom projecting side of the bag.
Fig. 23 is a plan of the mechanism for operating the paste boxes.
Figure 19:
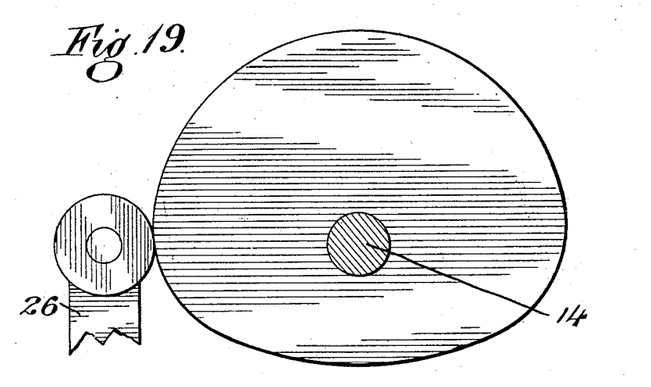
Fig. 19 is an elevation of a cam for operating a lever to move through suitable mechanism a slide for passing the bag along the mold.
Figure 20:
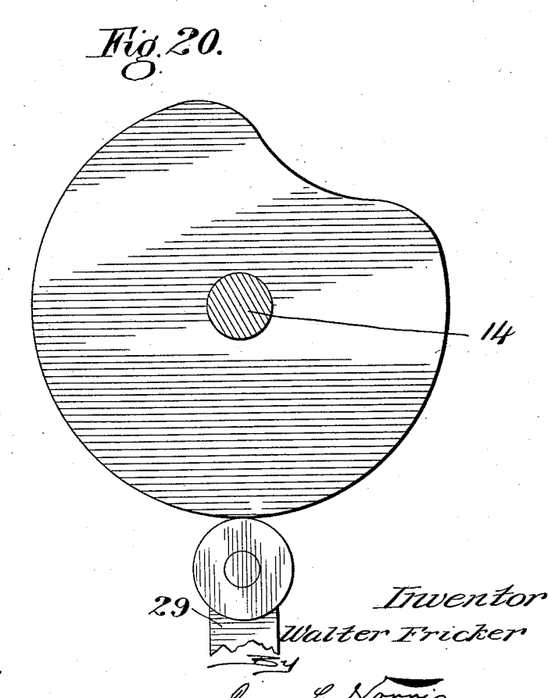
Fig. 20 is an elevation of a cam for operating a lever to move an end paste box.
Figure 22:
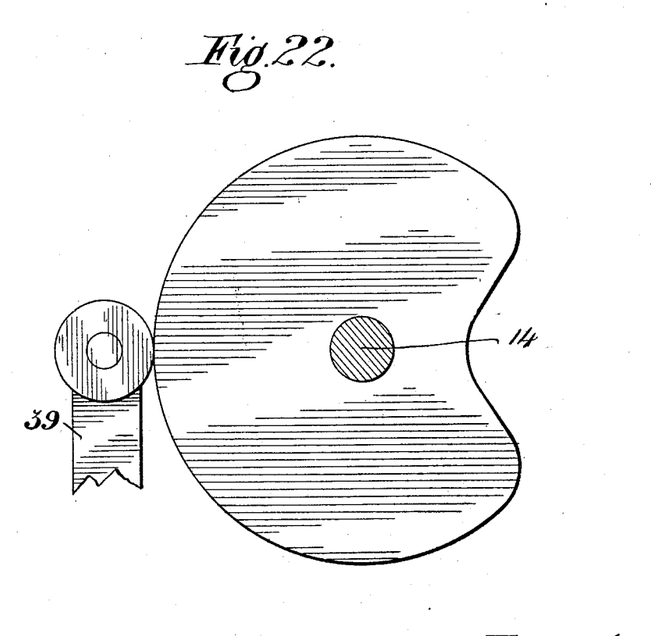
Fig. 22 is an elevation of a cam for operating a lever to give the shutters a reciprocating radial motion.
Figure 24:
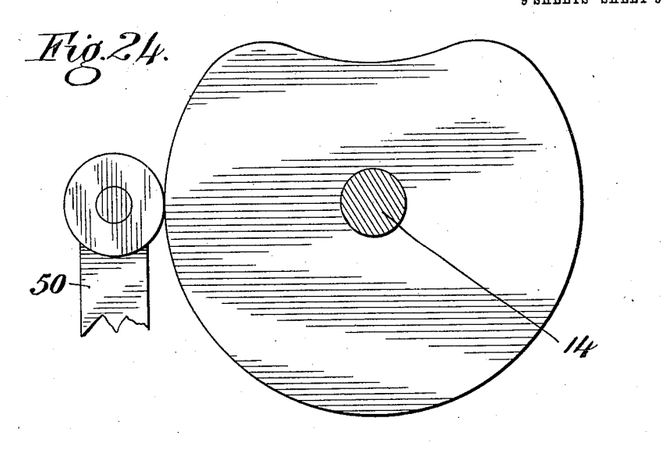
Fig. 24 is an elevation of a cam for operating a lever to move a plunger to form the resistance to the folders of laps.

As the table 2 and platform 3 rise, the finger 8 is caused to come in contact with the paper 1, and draws same up flush with the gage 7. The sinking platform 3 now stops against the underside of the mold bar 6, the table 2 still rising and folding the paper up both sides of the mold bar 6 as more clearly shown in Fig. 3. A near side folding angle lip 15 on the arm 15ᵃ carried by and operated through a shaft 16 actuated by a cam (see Fig. 17) on the shaft 14, then comes against the edge of the top mold bar 6, and folds down one edge of paper, and an off side spring folding and pressing roller 17 carried by arms 18 actuated by a lever 19 from a cam (see Fig. 18) on the shaft 14, moves across the top mold bar 6 and takes the other edge portion or flap of the paper with it and passing it just beneath a revolving paste spindle 20, from which the paper receives sufficient paste, from a box 21, to enable the edges of the paper to adhere to each other, when pressed by the roller 17 previously mentioned. The paste roller 20 is actuated by ratchet mechanism 22 from the arm 18 during the movement of the roller 17. The table 2, the angled lip 15 and the presser roller 17 now retire and leave the paper on the mold 6 in tubular form, somewhat loose. An adjustable slide 23 actuated through a lever 24, link 25, and lever 26 by a cam (see Fig. 19) on the shaft 14 then moves the folded tube of paper 1 along the mold bars 6 to the required distance, i. e., sufficient for the feeding of a fresh sheet, a portion of the tube projecting beyond the mold bar 6, as at Fig. 4, but it is not necessary that a determined length of the tube projects beyond the mold bars 6, as the folders will do the necessary folding to close the end of the tube to form the bag irrespective of the length projecting, thus almost any size sheet can be employed, without it being necessary to cut the sheets to fixed sizes. An end paste box 27 attached to sliding rod 28 having a lever 29, and actuated by a cam (see Fig. 20) on the shaft 14, then moves against the top front end of the paper tube, projecting beyond the end of the mold bars 6 to apply some paste thereto. Top folders 30 fixed to the carrier of the paste box 27 then with the box 27 move down and fold the top portion, see Figs. 4 and 5. Then bottom end folder 31 carried by rod 32 having a lever 33 operated by a cam (see Fig. 21) on the shaft 14 rises and folds the bottom projecting side of the tube up, see Figs. 6 and 7, the bottom folder also flattening the side tabs by two spring controlled flaps 34 pivoted thereto, and having lugs 34ª which act against left and right shutters 35 to be opened out and transfer the paste to the tabs, the shutters being fixed on pivoted rods 36 carrying arms 37 connected by links 38 to a lever 39 operated by a cam (see Fig. 22) on the shaft 14 for giving the shutters a reciprocating radial motion, these flaps 34 also pasting the tabs, having received enough paste while stationary from a couple of paste boxes 40, see Figs. 1 and 23, said boxes 40 being carried by arms 41 fixed on vertical shafts 42, said shafts obtaining a reciprocal radial movement by arm 46 and connecting rods 43 through levers 45, said levers being mounted on the shaft 16, the lever 44 being actuated by a cam (see Fig. 17) on the shaft 14 to produce the reciprocation of the boxes 40. At the same time the lip 15 is acting on a newly placed sheet which has been folded on the mold 6. The tabs are then turned and pressed against the end of the mold bars 6 by the pair of shutters 35, see Figs. 1, 6, 7 and 8. The open bag is then pushed off to a certain distance by a plunger 47, see Fig. 9, arranged between the mold bars and operated by a lever 40 connecting rod 49 to a lever 50 actuated by a cam (see Fig. 25) on the shaft 14, the end 51 forming the resistance to the folders and flaps. The bag is then pushed between quadruple reciprocating sectors 52, 53, 54, 55, situate on pivoted rods 56, which rods are connected by toothed gearing 57 actuated by a toothed wheel 58 on the main driving shaft 59, this carrying a pulley 60 operable by a belt 61. The sectors are arranged between guide plates 62 held between the shafts 56 to prevent the bag swelling while being collapsed; the plunger 47 retires and the sectors 52, 53, 54, 55 approach each other, and fingers 63 carried by arms 64 controlled by a spring 65, the arms 64 carrying inwardly projecting noses 66 which are operated by a pivoted lever 67 actuated by the cam 68 on the shaft 14, the fingers 63 press in the open wings or tabs of the bag, which may have come open due to the bag being pushed off the mold and the paste not being quite dry, and at the same time flexible tuck springs 69 carried by arms 70 controlled by a spring 71 and actuated through a depending arm 72 by a cam on the shaft 14, one on each side of each set of sectors, are advanced to the side walls of the bag and folds them inward and during this movement, a presser device 73 mounted on a shaft 74 and operable by the cam 68 through the lever 75 has been moved in front of the bag to form a resistance to insure the flat bottom being imparted to the bag during the after folding, and the open wings or tabs being positively stuck down, see Figs. 10 and 11.

Figure 13:
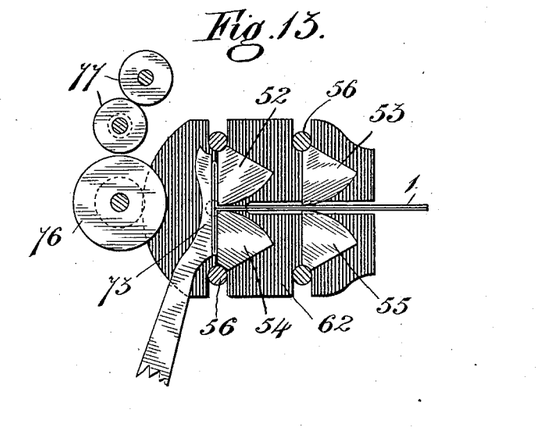
Fig. 13 shows the sectors with a complete bag folded ready to be passed to the rollers.
Figure 14:
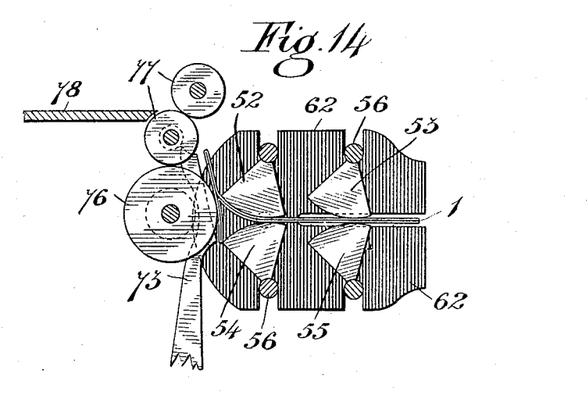
Fig. 14. shows the complete bag being led to the flattening rollers for delivery.
Figure 15:
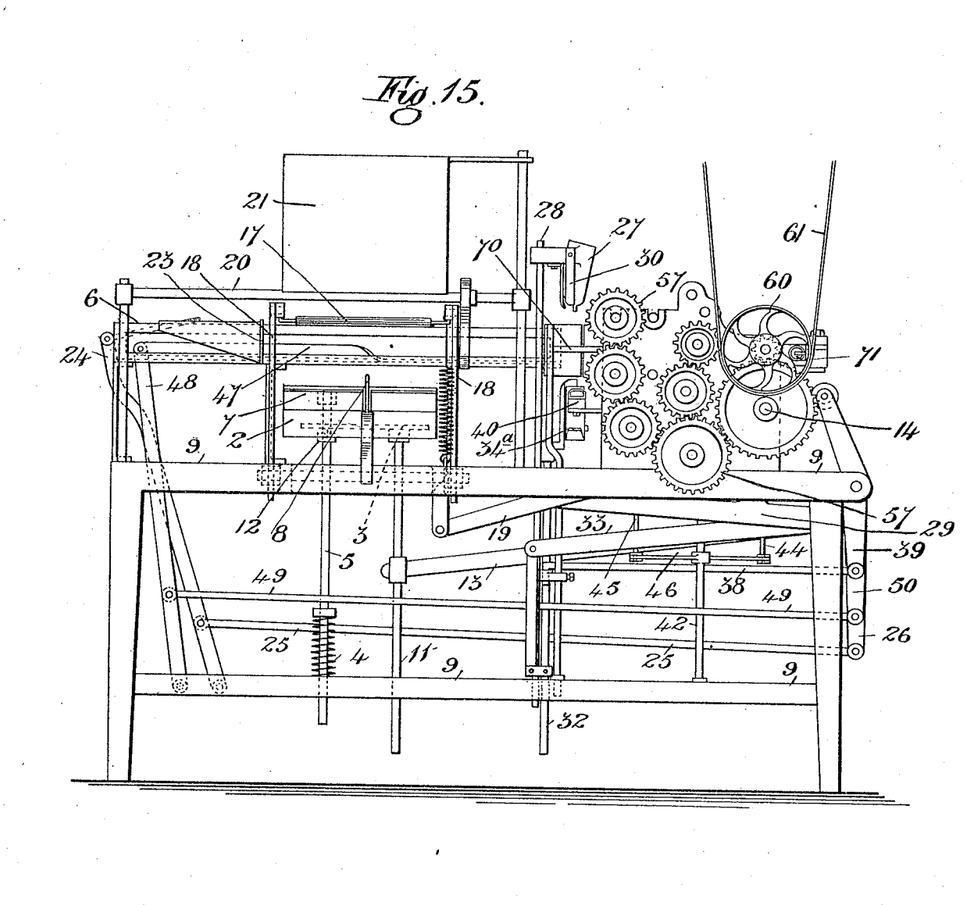
Fig. 15 is a side elevation of the machine opposite to that shown in Fig. 1.

When the tuckers 69 have effected their movement, the sectors 52, 53, 54, 55 move and press the bag down between them, thus folding the bag with the bottom at right angles. On further movement of the sectors 52, 53, 54, 55, the presser 73 moves backward, the sectors drawing the bag off the mold bar 6 and carrying it to a lifting roller 76 pivoted in the frame and operated by the gear for passage to flattening rollers 77 also operated by gear and a delivery table 78, one sector 52 pressing the bag against the lifting roller 76, and causing the right angled end to flatten on the under side of the bag, see Figs. 13 and 14.

By using quadruple reciprocating sectors, the paper tube is grasped at four different places, thus drawing forward and collapsing the partly formed bag with a parallel motion, insuring a parallel tube and preventing the spreading or contracting of the bag.

By using flexible tuck springs 69, for forming the inward tuck of the bag, the paper is always kept taut, which prevents it crumpling, while at the same time they bend sufficiently to prevent its being slit or pierced, which they would be likely to do if rigid. The presser 73 works over against both the top and bottom front sectors 52, 54, as they meet, and as this presser 73 falls back, the lifting and turning roller 76 working against the front top sector 52, turns the bag upward, and carries same forward into the flattening rollers 77, which delivers same on to the table 78 for collection. Where simple cams are employed for actuating the parts, springs are employed to keep the mechanism normal, but when race cams are employed, the springs may be dispensed with.

What I claim and desire to secure by Letters Patent is:—

1. A paper bag machine having a rising and falling table provided with a platform, said table being also provided with a gage, and a roller, combined with a sensitive finger to draw a sheet of paper from said platform against said gage.

2. In a paper bag machine, means for supporting a tubular bag blank, combined with folding mechanism for folding the bottom portion of the bottom of the bag, and flattening the side tabs, spring controlled flaps which coöperate with the folding mechanism for pasting the tabs, means for applying paste to the said flaps, and means for folding the tabs on the end of the bag.

3. In a paper bag machine, the combination of a mold for receiving a paper bag blank, means for pushing the bag nearly off the mold, a plurality of coöperating opposed sectors for flattening the bag and drawing same from the mold, a presser device against which the bottom of the bag is flattened by the first two sectors, and spring controlled tucking means for folding in two opposite sides of the bag.

4. In a paper bag machine, the combination of a mold for receiving a paper bag blank, a plurality of coöperating opposed sectors for drawing the bag from the mold, and spring controlled tucking means for the bag.

5. In a paper bag machine, a rising and falling table provided with a platform, said table having a gage and a roller, combined with a sensitive finger to draw a sheet of paper from said platform against said gage, a mold or forming device, a pasting roller, means for placing a sheet of paper about said mold, means for folding one edge of the paper, a yieldingly mounted folding and pressing roller movable to press the other edge of the paper against the paste roller, and then press such pasted edge on the other edge of the paper to form a tubular blank, means for moving the tubular blank along the mold for one end to project therefrom, a movably mounted carrier, a paste box and folding mechanism supported on the carrier for pasting and folding down the top portion and top sides of the end of the tubular blank, folding mechanism for folding up the bottom end and lower sides of the end of the tubular blank and flattening the tabs formed by the folded sides, spring controlled flaps which coöperate with the folding mechanism for pasting the tabs, means for applying paste to the said flaps, means for folding the tabs on the end of the bag, means for pushing the bag nearly off the tube, a plurality of coöperating opposed sectors for flattening the bag and drawing same from the mold, a presser device against which the bottom of the bag is flattened by the first two sectors, spring controlled tucking means for folding in two opposite sides of the bag, means for folding the bottom of the bag in approximately the same plane as the bag and ejecting same from the machine.

6. In a paper bag machine, the combination of a mold for supporting a tubular bag, a plurality of sectors arranged in coöperating pairs for compressing the bag and for drawing it off the mold, spring controlled tucking mechanism for the bag, and presser and lifting rollers between which the bag is received from the mold.

In testimony whereof I have hereunto set my hand in presence of two subscribing witnesses.

WALTER FRICKER.

Witnesses:
FREDERICK CHARLES SMITH,
WILLIAM OSWALD BROWN.